United States Patent [19]

Nemoto

[11] Patent Number: 4,853,809
[45] Date of Patent: Aug. 1, 1989

[54] APPARATUS FOR REPRODUCING VIDEO SIGNALS AS SLOW-MOTION PICTURES

[75] Inventor: Shoji Nemoto, Kanagawa, Japan

[73] Assignee: Sony Corp., Tokyo, Japan

[21] Appl. No.: 51,612

[22] Filed: May 20, 1987

[30] Foreign Application Priority Data

Jun. 10, 1986 [JP] Japan .................................. 61-134679

[51] Int. Cl.$^4$ ........................................... H04N 5/783
[52] U.S. Cl. .................................. 360/10.3; 360/77.14
[58] Field of Search ........................ 360/10.2, 10.3, 77, 360/78, 77.14, 77.15, 78.02

[56] References Cited

U.S. PATENT DOCUMENTS

| | | | |
|---|---|---|---|
| 4,393,422 | 4/1983 | Yokobori et al. | |
| 4,484,235 | 7/1984 | Yokobori et al. | |
| 4,497,000 | 1/1985 | Terada et al. | 360/77 |
| 4,509,083 | 4/1985 | Nakano | 360/77 |
| 4,563,714 | 1/1986 | Takeuchi | 360/77 |
| 4,568,986 | 2/1986 | Furuhata et al. | 360/10.2 |
| 4,581,658 | 4/1986 | Azuma et al. | 360/10.2 |
| 4,581,659 | 4/1986 | Azuma et al. | 360/10.2 |
| 4,594,615 | 6/1986 | Nemoto et al. | 360/77 |
| 4,604,656 | 8/1986 | Fujii | 360/10.3 |
| 4,642,704 | 2/1987 | Doutsubo | 360/10.2 |
| 4,644,414 | 2/1987 | Yamada et al. | 360/10.2 |
| 4,649,439 | 3/1987 | Tanaka | 360/10.3 |
| 4,651,239 | 3/1987 | Omori et al. | 360/77 |
| 4,663,673 | 5/1987 | Doutsubo | 360/10.2 |
| 4,677,503 | 6/1987 | Nagasawa et al. | 360/10.3 |
| 4,680,648 | 7/1987 | Takayama | 360/10.2 |
| 4,686,589 | 8/1987 | Takimoto | 360/77 |
| 4,714,971 | 12/1987 | Sigiki et al. | 360/77 |
| 4,739,420 | 4/1988 | Odaka et al. | 360/77 |
| 4,760,474 | 7/1988 | Takimoto | 360/77 |
| 4,764,819 | 8/1988 | Kubo et al. | 360/10.3 |

FOREIGN PATENT DOCUMENTS

| | | |
|---|---|---|
| 0194099 | 9/1986 | European Pat. Off. . |
| 3519574 | 12/1985 | Fed. Rep. of Germany . |
| 2161976 | 1/1986 | United Kingdom . |

Primary Examiner—Donald McElheny, Jr.
Attorney, Agent, or Firm—Alvin Sinderbrand

[57] ABSTRACT

In an apparatus for slow-motion reproduction of a video signal having successive field thereof, along with respective pilot signals, recorded in successive oblique tracks on a magnetic tape, a tracking error signal is based on the pilot signals reproduced from the magnetic tape, a capstan motor intermittently transports the tape between a first rest position, in which a field segment of the video signal is repeatedly reproduced from an initial one of alternate oblique tracks, rest position, to a second in which another field segment of the video signal is repeatedly reproduced from the next one of the alternate oblique tracks. A circuit controls a driving circuit for the capstan motor so that the transportation of the magnetic tape from the first to second rest position is responsive to the tracking error signal obtained in the first rest position, that is, prior to transportation of the magnetic tape.

13 Claims, 5 Drawing Sheets

PRIOR ART

PRIOR ART

FIG. 7A HS1
FIG. 7B Pr
FIG. 7C CON
FIG. 7D
FIG. 7E CCW
FIG. 7F CWD
FIG. 7G Et
FIG. 7H
FIG. 7I GS

APPARATUS FOR REPRODUCING VIDEO SIGNALS AS SLOW-MOTION PICTURES

BACKGROUND OF THE INVENTION

1. Field of the Invention

This invention relates generally to apparatus for reproducing a video signal as a slow-motion picture, and more particularly, is directed to video tape recording and reproducing apparatus (VTR) of the type in which successive fields of the video signal are recorded in parallel oblique tracks on a magnetic tape and a slow motion effect is achieved by intermittently advancing the tape while reproducing fields of the video signal recorded in the oblique tracks scanned during each advancement and by repeatedly reproducing a video signal field recorded in an oblique track during each interval when the tape is at rest.

2. Description of the Prior Art

A VTR has been proposed in which two rotary magnetic heads having different head gap angles or azimuths alternately record successive fields of a video signal, along with respective pilot signals, in successive oblique tracks on a magnetic tape while the latter is transported at a normal tape speed. The pilot signals recorded in a predetermined number of the successive tracks constituting a group thereof have respective different frequencies in an order that is repeated cyclically for each of the track groups.

In a normal reproducing operation of the VTR, the successive tracks are alternately scanned by first and second rotary magnetic heads having azimuth angles corresponding to those of the heads with which the respective tracks were recorded and a reference pilot signal is provided with a frequency which, at any time, corresponds to the frequency of the pilot signal recorded in the track then intended to be scanned by a rotary magnetic head. Further, in the normal reproducing mode, if the scanning path of a rotary magnetic head deviates from the track intended to be reproduced thereby, the reproduced pilot signal contains a mixture of components respectively having the frequency of the pilot signal recorded in the track intended to be scanned and the frequency of the pilot signal recorded in the adjacent track toward which the scanning path deviates. From the reference pilot signal and the reproduced pilot signal, a tracking error signal is obtained which has an amplitude and polarity corresponding to the amount and direction of the deviation of the scanning path from the track intended to be reproduced, and the transportation of the tape, for example, by a capstan motor, is controlled to maintain accurate tracking during normal reproduction.

In a slow-motion picture reproducing mode of the previously proposed VTR, the magnetic tape is transported intermittently so that, during each of the successive intervals when the tape is at rest, rotary magnetic heads having the same head gap angles or azimuths repeatedly scan one of the oblique tracks recorded with such head gap angle for reproducing a still picture from the field segment of the video signal repeatedly reproduced from the scanned oblique track. A video signal synthesized to represent a slow-motion picture is derived from such still pictures and the fields of the video signal reproduced from the oblique tracks during tape transporting intervals between successive still picture intervals. Such slow-motion picture can be obtained with suppressed noise by controlling the scanning path of the rotary magnetic heads on the magnetic tape so as to minimize, during each still-picture reproducing interval, deviation of the scanning path from the lateral center of the track being scanned at the middle portion of such track considered in the longitudinal direction of the latter. In the previously proposed VTR, such noise suppression is intended to be achieved by correcting the scanning path of the rotary magnetic head or heads in response to the tracking error signal, derived as described earlier, during a tape transport period which precedes each still-picture reproducing interval, that is, at a time when the magnetic tape is being driven by the capstan motor. In other words, the scanning path of the rotary magnetic head or heads is corrected during the period in which the capstan motor is driven in response to the tracking error signal arising during such tape transporting period so that, in the next still-motion reproducing interval, the scanning path of the rotary magnetic heads on the magnetic tape will laterally bisect the middle portion, considered in the longitudinal direction, along the oblique track from which a field segment of the video signal is to be reproduced repeatedly. However, such scanning path of the rotary magnetic heads on the magnetic tape after the transportation of the magnetic tape is apt to be adversely influenced by variations in the torque of the capstan motor. Therefore, there is the danger that the scanning path of the rotary magnetic heads on the magnetic tape will not precisely laterally bisect the middle portion of the oblique track from which a field segment of the video signal is reproduced repeatedly after the transportation of the tape.

It has also been proposed to control the scanning path of the rotary magnetic heads in the slow-motion picture reproducing mode by means of a microcomputer, for example, as disclosed in Japanese Patent Application published before examination under Publication No. 60/202563. In this published application, a tracking error signal corresponding to a middle portion of a field segment of the video signal is converted to digital data by an analog-to-digital converter and written in a microcomputer for each field segment of the video signal reproduced repeatedly from one oblique track prior to the transportation of the magnetic tape. The digital data written in the microcomputer are compared with a data map stored in the microcomputer and, as a result of such comparison, there are obtained predetermined timing data for starting the acceleration and deceleration of a capstan motor in the following period during which the magnetic tape is to be transported. Based on such predetermined timing data, the times for starting acceleration and deceleration of the capstan motor are controlled so that, at the completion of a period during which the tape is transported, the scanning path of the rotary magnetic heads used for repeatedly reproducing a field interval of the video signal from one track on the magnetic tape will laterally bisect such track at the middle portion of the latter considered in the longitudinal direction therealong.

However, in the case where the scanning path of the rotary magnetic heads is controlled by a microcomputer, for example, as disclosed in Japanese Patent Application published before examination under Publication No. 60/202563, an analog-to-digital converter and a microcomputer for storing the data map are required and this results in a disadvantageous complication of the circuit configuration.

OBJECTS AND SUMMARY OF THE INVENTION

Accordingly, it is an object of the present invention to provide a VTR having a slow-motion reproducing mode and which avoids the aforementioned problems encountered with the prior art.

Another object of the present invention is to provide an apparatus for slow-motion reproduction of a video signal having successive fields thereof, along with respective pilot signals, recorded in successive parallel tracks extending obliquely on a magnetic tape, the pilot signals recorded in a predetermined number of said tracks constituting a group thereof having respective different frequencies in an order that is repeated cyclically for each said group of tracks on the tape; and wherein tracking errors of a rotary magnetic head in relation to one of the oblique tracks to be scanned thereby are detected through the use of the pilot signals, and noise is suppressed in the reproduced slow-motion picture by minimizing such tracking errors.

A further object of the present invention is to provide an apparatus, as aforesaid, in which a slow-motion picture is synthesized by intermittently transporting the tape so that each tape transporting period is interposed between preceding and succeeding still-motion reproducing intervals, and wherein noise resulting from tracking errors of a rotary magnetic head in relation to the oblique track from which a field segment of the video signal is repeatedly reproduced is suppressed by laterally centering the scanning path of that rotary head relative to the respective track at the middle portion of the latter considered in the longitudinal direction along the track.

Still another object is to provide an apparatus, as aforesaid, in which the suppression of noise is effectively realized without regard to variations that may occur in the torque generated by a capstan motor provided for driving the tape during each tape transporting period of the apparatus in its slow-motion reproducing mode.

A still further object of the present invention is to provide an apparatus, as aforesaid, in which noise is suppressed in the slow-motion reproducing mode by means of a relatively simple circuit arrangement.

In accordance with an aspect of the present invention, an apparatus for slow-motion reproduction of a video signal having successive fields thereof, along with respective pilot signals, recorded in successive parallel tracks extending obliquely on a magnetic tape, with the pilot signals recorded in a predetermined number of the tracks constituting a group thereof having respective different frequencies in an order that is repeated cyclically for each group of tracks on the tape, comprises rotary magnetic head means for reproducing a field of the video signal and a respective pilot signal by scanning substantially along one of the tracks, capstan means coupled with a capstan motor for transporting the magnetic tape with reference to the rotary magnetic head means, tracking error signal generating means for producing, based on pilot signals reproduced from the magnetic tape by said rotary magnetic head means, a tracking error signal varying in accordance with tracking errors of the rotary magnetic head means in relation to the one of the tracks being scanned thereby, driving means for causing the capstan motor and capstan means to transport the magnetic tape from one still-picture reproducing state in which a field of the video signal is repeatedly reproduced by the rotary magnetic head means scanning an initial or preceding one of the oblique tracks on the magnetic tape while the latter is at rest to another still-picture reproducing state in which another field of the video signal is repeatedly reproduced by the rotary magnetic head means scanning a later or succeeding one of said oblique tracks while the tape is again at rest, and control means for controlling the driving means during transport of the magnetic tape in response to said tracking errors of said rotary magnetic head means relative to a middle portion of said initial track in said one still-picture reproducing state prior to said transport of the magnetic tape so that deviation of said rotary magnetic head means with reference to the middle portion of said succeeding oblique track is minimized in said other still-picture reproducing state after said transport of the magnetic tape. Further, it is a feature of the present invention to provide an apparatus, as aforesaid, with reference pilot signal supplying means for supplying, to the tracking error signal generating means, a reference pilot signal having a frequency corresponding, at any time, to the frequency of the pilot signal recorded in the one of the oblique tracks to be then scanned by the rotary magnetic head means; and in which the tracking error signal generating means includes means receiving the reference pilot signal and the pilot signals reproduced from the magnetic tape by the rotary magnetic head means scanning said preceding one of the tracks for producing said tracking error signal therefrom.

Since the apparatus for slow-motion reproducing of a video signal in accordance with the present invention controls the transport of the tape by the capstan motor in response to a tracking error signal derived during a preceding still-motion reproducing interval when the tape is at rest, torque variations of the capstan motor do not influence the accuracy of such tracking error signal or the accuracy with which the scanning path of a rotary magnetic head operative during the next still-motion reproducing interval can be made to laterally bisect the respective oblique track at the middle portion of the latter considered in the direction along such track.

Further, it is an advantageous feature of the invention to sample and hold the tracking error signal corresponding to the scanning of a middle portion of an oblique track during an initial or preceding still-motion reproducing interval and to add such tracking error signal, with an appropriate polarity, to an accelerating voltage to be supplied to the capstan motor at the onset of the following tape transporting period, so as to vary the acceleration characteristic of the capstan motor during transporting of the tape and thereby ensure that, in the next or later still-motion reproducing interval, the scanning path of the rotary head then operative will laterally bisect the respective track at the middle portion thereof. Consequently, the circuit configuration of the apparatus according to the invention can be simplified, as it does not require any analog-to-digital converter, microcomputer or the like.

The above, and other objects, features and advantages of the present invention, will become apparent from the following detailed description which is to be read in conjunction with the accompanying drawings.

BRIEF DESCRIPTION OF THE DRAWINGS

FIGS. 2A to 2J are timing charts to which reference will be made in explaining the generation of a tracking error signal in a normal reproducing mode of the known VTR;

FIGS. 4A to 4D are timing charts to which reference will be made in explaining the operation of a previously proposed VTR in its slow-motion reproducing mode;

FIGS. 7A to 7I are timing charts to which reference will be made in explaining the operation of the embodiment of the invention shown in FIG. 5.

DESCRIPTION OF THE PREFERRED EMBODIMENT

Figure 1:
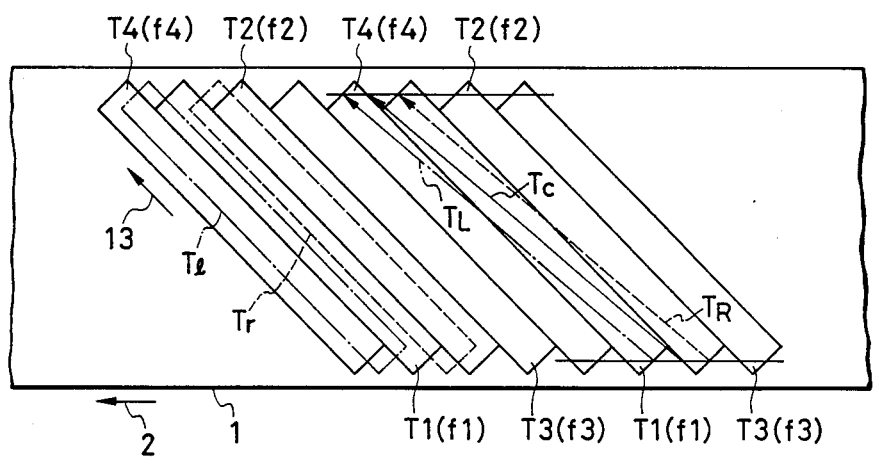
FIG. 1 is a schematic illustration showing a track pattern in which a video signal is recorded on a magnetic tape and further showing scanning paths of rotary magnetic heads on the magnetic tape in reproducing modes of a VTR according to the prior art.
Figure 1:

In order to facilitate understanding of the present invention, a previously proposed video tape recorder (VTR) and the problems associated with its operation in a slow-motion reproducing mode will now be described in greater detail. In such previously proposed video tape recorder, four pilot signals having frequencies $f_1$, $f_2$, $f_3$ and $f_4$, respectively, are recorded respectively in four successive oblique tracks $T_1$, $T_2$, $T_3$ and $T_4$ which are arranged repeatedly on a magnetic tape 1, as shown in FIG. 1. The frequencies $f_1$, $f_2$, $f_3$ and $f_4$ are different and are selected to satisfy the following relations:

$$|f_1-f_2|=|f_3-f_4|=f_a, |f_2-f_3|=|f_4-f_1|=f_b$$

(in which $f_a$ and $f_b$ are predetermined frequencies, respectively). The oblique tracks $T_1$ and $T_3$ are recorded by a first rotary magnetic head having a first gap angle or azimuth, and the oblique tracks $T_2$ and $T_4$ are recorded by a second rotary magnetic head having a second or different gap angle or azimuth, while tape 1 is transported at a normal tape speed in the direction of an arrow 2. The rotary magnetic heads alternately scan the tape in the direction indicated by an arrow 13.

In a normal reproducing operation of the VTR, the tracks $T_1$ and $T_3$ and the track $T_2$ and $T_4$ are alternately scanned by respective first and second rotary magnetic heads having azimuth angles corresponding to those of the heads with which the respective tracks were recorded. Further, in the normal reproducing mode, a reference pilot signal Pr is modified to have a selected one of the frequencies $f_1$, $f_2$, $f_3$ and $f_4$ in accordance with the oblique track $T_1$, $T_2$, $T_3$ or $T_4$ from which the video signal is being reproduced in each field period.

In the normal reproducing mode, if the scanning path of the rotary magnetic head intended for reproduction from the oblique track $T_1$ deviates from that track to the right as viewed on FIG. 1, for example, to the parallel position indicated by a broken line Tr, during a field period in which the reference pilot signal Pr is given the frequency $f_1$, a reproduced pilot signal Pp included in the output of that rotary head contains a component of the frequency $f_1$ and a component of the frequency $f_2$ mixed with a component of the frequency $f_1$, as indicated in FIG. 2D. As a result thereof, and as shown in FIG. 2H, a tracking error signal Et is obtained which has, for example, a negative voltage level varying in proportion to the amount of deviation of the head scanning path from the oblique track $T_1$.

Similarly, if the head scanning path of the rotary magnetic head for reproduction of the video signal from the oblique track $T_2$, $T_3$ or $T_4$ deviates from the oblique track $T_2$, $T_3$ or $T_4$ to the right, as viewed in FIG. 1, during the field period in which the reference pilot signal Pr is given the frequency $f_2$, $f_3$ or $f_4$, respectively, the reproduced pilot signal Pp contains a component of the frequency $f_2$ and a component of the frequency $f_3$ mixed with a component of the frequency $f_2$; a component of the frequency $f_3$ and a component of the frequency $f_4$ mixed with a component of the frequency $f_3$; or a component of the frequency $f_4$ and a component of the frequency $f_1$ mixed with a component of the frequency $f_4$, as shown in FIG. 2D. Accordingly, as shown in FIG. 2H, a tracking error signal Et is obtained which has a negative voltage level varying in proportion to the amount of the deviation of the head scanning path from the oblique track $T_2$, $T_3$ or $T_4$.

On the contrary, when the head scanning path of the rotary magnetic head for reproducing the video signal from oblique track $T_1$ deviates from the latter toward the left as viewed on FIG. 1, for example, to the parallel position shown by a dot-dash line $T_l$, during a field period in which the reference pilot signal Pr is given the frequency $f_1$, the reproduced pilot signal Pp included in the output of that rotary head contains a component of the frequency $f_1$ and a component of the frequency $f_4$ mixed with a component of the frequency $f_1$, as shown in FIG. 2I. Accordingly, as shown in FIG. 2J, a tracking error signal Et is obtained which has, for example, a positive voltage level varying in proportion to the amount of the deviation of the head scanning path from the oblique track $T_1$.

Similarly, if the head scanning path of the rotary magnetic head for reproducing the video signal from the oblique track $T_2$, $T_3$ or $T_4$ deviates from the oblique track $T_2$, $T_3$ or $T_4$ to the left, as viewed in FIG. 1, during the field period in which the reference pilot signal Pr is given the frequency $f_2$, $f_3$ or $f_4$, respectively, the reproduced pilot signal Pp contains a component of the frequency $f_2$ and a component of the frequency $f_1$ mixed with a component of the frequency $f_2$; a component of the frequency $f_3$ and a component of the frequency $f_2$ mixed with a component of the frequency $f_3$; or a component of the frequency $f_4$ and a component of the frequency $f_3$ mixed with the component of the frequency $f_4$, as shown in FIG. 2I. Accordingly, as shown in FIG. 2J, a tracking error signal Et is obtained which has a positive voltage level varying in proportion to the amount of the deviation of the head scanning path from the oblique track $T_2$, $T_3$ or $T_4$.

In a slow-motion picture reproducing mode of the previously proposed VTR, the magnetic tape is transported intermittently so that, during successive intervals when the tape is at rest, alternate oblique tracks on the magnetic tape, for example, the tracks $T_1$ and $T_3$, are repeatedly scanned by rotary magnetic heads having the same azimuth corresponding to that with which such tracks were recorded, for reproducing a still picture from the field segment of the video signal reproduced from each of the alternate oblique tracks. A video signal synthesized to represent a slow-motion picture is derived from such still pictures and the fields of the video signal reproduced from the intervening oblique tracks which are scanned during tape transporting intervals between successive still picture reproducing intervals. Such slow-motion picture can be obtained with suppressed noise by controlling the scanning path of the rotary magnetic heads on the magnetic tape during each still-picture reproducing interval so as to minimize deviation of such scanning path from the lateral center of the track being scanned at the middle portion of such track considered in the longitudinal direction of the latter. For example, in the case where the oblique track $T_1$ on magnetic tape 1 in FIG. 1 is scanned repeatedly so that the field segment of the video signal recorded therein is reproduced repeatedly, if the scanning path of the rotary magnetic head is controlled to laterally bisect track $T_1$ in the direction of its width at the middle portion of track $T_1$ considered in the longitudinal direction thereof, as shown by a solid line Tc in FIG. 1, noise which arises in a field segment of the video signal reproduced from oblique track $T_1$ due to the angular deviation of the scanning path of the rotary magnetic head from such track $T_1$ appears mainly in the vertical blanking period and, in any case, does not appear in the middle of the field period. On the other hand, when the scanning path of the rotary head on magnetic tape 1 deviates from the path shown by the solid line Tc in FIG. 1 in the direction toward the oblique track $T_2$, that is, in the direction opposed to the direction 2 of the tape transport, for example, to the position indicated by a broken line $T_R$ in FIG. 1, or in the direction toward the oblique track $T_4$, for example, to the position indicated by a dot-dash line $T_L$ in FIG. 1, a large amount of noise arises in the middle of the field segment of the video signal reproduced from oblique track $T_1$.

Figure 3A:
FIGS. 3A to 3G are timing charts to which reference will be made in explaining the generation of a tracking error signal in a still-picture reproducing interval of the known VTR.
Figure 3B:
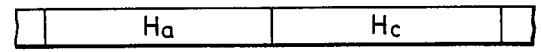
Figure 3C:
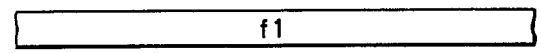
Figure 3D:
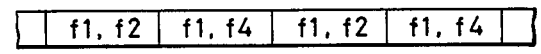

During each still-picture reproducing interval in which a field segment of the video signal is repeatedly reproduced from one or the other of tracks $T_1$ and $T_3$ on magnetic tape 1, if the scanning path of the rotary magnetic heads on the magnetic tape 1 is made to laterally bisect the middle portion of the respective track, considered in the longitudinal direction thereof, the reproduced pilot signal Pp contains, for example, in the case of track $T_1$, a component of the frequency $f_1$, a component of the frequency $f_2$ mixed with a component of the frequency $f_1$ in the first half of the field period, and a component of the frequency $f_4$ mixed with the component of the frequency $f_1$ in the latter half of the field period, as shown in FIG. 3D for the situation wherein a reference pilot signal Pr is selected to have the frequency $f_1$, as shown in FIG. 3C. The level of the component of the frequency $f_1$ in the reproduced pilot signal Pp increases gradually from the beginning to the middle of the field period and then decreases gradually from the middle to the end of the field period, and the tracking error signal Et is in the form of a sawtooth voltage which becomes zero at the middle of the field period, as shown by a solid line in FIG. 3G.

Figure 3E:
Figure 3F:
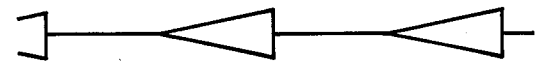
Figure 3G:
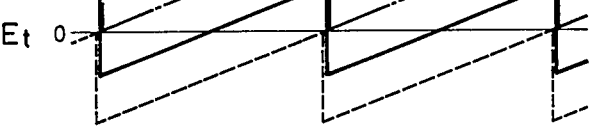

On the other hand, if the scanning path of the rotary magnetic heads on the magnetic tape 1 deviates from the scanning path laterally bisecting the middle portion of the track, considered in the longitudinal direction, for example, in the direction from the oblique track $T_1$ from which a field segment is to be reproduced toward the oblique track $T_2$, as shown in FIG. 1 at TR, the tracking error signal Et in the form of a sawtooth voltage has a relatively low level in its entirety and is provided with a negative value at the middle of the field period, for example, as shown by a broken line in FIG. 3G. Further, if the scanning path of the rotary magnetic heads on the magnetic tape 1 deviates from the scanning path laterally centered at the middle portion of the oblique track $T_1$ toward the oblique track $T_4$, as indicated by the dot-dash line TL on FIG. 1, the tracking error signal Et in the form of a sawtooth voltage has a relatively high level in its entirety and is provided with a positive value at the middle of the field period, as shown by a dot-dash line in FIG. 3G.

In the previously proposed VTR, it has been intended to control the scanning path of each rotary magnetic head on the magnetic tape to substantially laterally bisect the middle portion, considered in the longitudinal direction along the oblique track from which a field period or segment of the video signal is to be reproduced, so that each field period or segment of the video signal can be obtained with noise suppressed to a minimum in the middle of the field period during each still picture reproducing interval. In the previously proposed VTR, such noise suppression is intended to be achieved by correcting the scanning path of the rotary magnetic head or heads in response to a tracking error signal derived during a period which precedes each still-picture reproducing interval, that is, at a time when the magnetic tape is being transported.

By way of example, a case wherein a field segment of the video signal is selectively reproduced from oblique tracks $T_1$ and $T_3$, respectively, during alternate still-picture reproducing intervals, will now be described with reference to FIGS. 4A to 4D. In this case, first a field segment of the video signal is reproduced repeatedly, for example, three times, from the oblique track $T_1$ by two heads alternately scanning track $T_1$ and having the same head gap angle or azimuth. In a next field period commencing at a time $t_4$, a capstan motor is started at a time $t_5$ a little later than the time $t_4$ and the motor is accelerated, as shown in FIG. 4C, so as to similarly transport the tape. From the time $t_6$, the capstan motor is driven at a constant speed equal to the speed for the normal reproducing mode through a field period commencing at the time $t_6$ up to a time $t_8$ within the next field period commencing at the time $t_7$. The capstan motor is then decelerated after the time $t_8$ so as to stop the tape at a time $t_9$. During such operation of the capstan motor, the scanning path of each rotary magnetic head on the magnetic tape 1 is corrected by varying the rotational speed of the capstan motor in response to the tracking error signal Et then being detected and which varies as shown in FIG. 4D. More particularly, during the period from the time $t_6$ to the time $t_8$ in which the capstan motor is driven to transport the tape at a substantially constant speed, the operating speed of the capstan motor is adjusted in response to the signal Et being then generated for ensuring that, in the next still-picture reproducing interval, a field segment will be reproduced repeatedly during a plurality of successive field periods after the time $t_9$ from the oblique track $T_3$ by rotary magnetic heads having their scanning path laterally bisecting the middle of track $T_3$.

The reference pilot signal Pr is provided with the frequency $f_1$ up to the time $t_6$, with the frequency $f_2$ in the field period from time $t_6$ to the time $t_7$, and with the frequency $f_3$ after the time $t_7$, as shown in FIG. 4B. Further, in response to a head switching signal HS1 reversing in level at every field period, as shown in FIG. 4A, the field segment of a video signal recorded in a track $T_1$ or $T_3$ is reproduced repeatedly by the two rotary magnetic heads which have the same gap angle or azimuth and which alternately scan the oblique track $T_1$ or $T_3$ in the period of time preceding the time $t_4$ and in the period of time after the time $t_9$, that is, in each still-picture reproducing interval when the magnetic tape is stationary or at rest. The field segments of the video signal are reproduced successively by two rotary magnetic heads which have different gap angles or azimuths, respectively, and which alternately scan the oblique tracks $T_1$, $T_2$ and $T_3$ in the period from the time $t_4$ to the time $t_9$ during which the magnetic tape is transported.

However, in the foregoing video tape recorder wherein the scanning path of the rotary magnetic head is corrected in response to the tracking error signal during the period of time in which the capstan motor is driven to rotate at a constant speed and the transport of the magnetic tape is controlled so that the scanning path of the rotary magnetic heads on the magnetic tape will laterally bisect the middle portion, considered in the longitudinal direction, along the oblique track from which a field segment of the video signal is to be reproduced repeatedly after the transportation of the magnetic tape, such scanning path of the rotary magnetic heads on the magnetic tape after the transportation of the magnetic tape is apt to be adversely influenced by variations in torque of the capstan motor. Therefore, there is the danger that the scanning path of the rotary magnetic heads on the magnetic tape will not precisely laterally bisect the middle portion of the oblique track from which a field segment of the video signal is reproduced repeatedly after the transportation of the tape.

Figure 5:
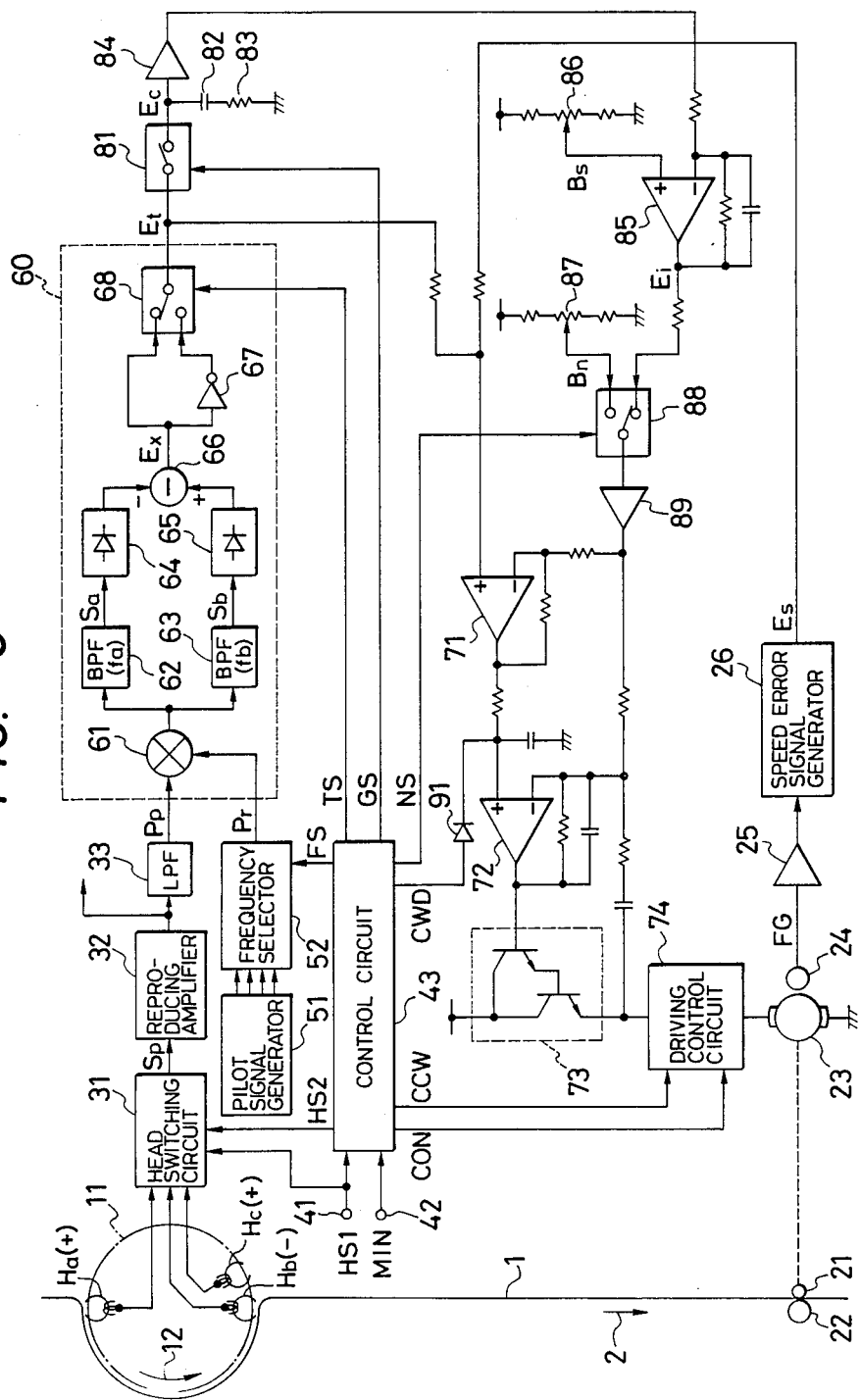
FIG. 5 is a schematic diagram showing a VTR having a slow-motion reproducing mode according to one embodiment of the present invention.

Referring now to FIG. 5, it will be seen that an apparatus for reproducing a video signal with a slow-motion effect according to an embodiment of the present invention includes a head guide drum or cylinder 11 having three rotary magnetic heads Ha, Hb and Hc mounted thereon. The rotary magnetic heads Ha and Hb are provided with respective different azimuths or gap angles and are disposed diametrically opposite each other with the center of the head cylinder 11 therebetween for use in both recording and reproducing modes. The rotary magnetic head Hc is provided with a gap angle the same as that of the rotary magnetic head Ha and is disposed close to rotary magnetic head Hb for use in a still-picture reproducing mode. These rotary magnetic heads Ha, Hb and Hc are rotated in the direction indicated by an arrow 12 at a speed of one revolution per frame, that is, for every two field periods of the video signal. The magnetic tape 1 is wound about cylinder 11 with a wrapping angle of more than 180 degrees and is transported in the longitudinal direction indicated by an arrow 2 by the combined action of a capstan 21, which is driven by a capstan motor 23, and a pinch roller 22 bearing against capstan 21 with magnetic tape 1 between.

During recording, a large number of successive oblique tracks are provided on magnetic tape 1 at an angle to the running direction of the magnetic tape. In each of the oblique tracks, a field of the video signal is recorded along with one of four pilot signals having respective different frequencies $f_1$, $f_2$, $f_3$ and $f_4$. The pilot signals recorded in four successive oblique tracks are different from one another in frequency. The frequencies $f_1$, $f_2$, $f_3$ and $f_4$ are selected to satisfy the following relations:

$$|f_1-f_2|=|f_3-f_4|=f_a, |f_2-f_3|=|f_4-f_1|=f_b$$

(in which $f_a$ and $f_b$ are predetermined frequencies, respectively). For example, $f_1$ is 103 kHz, $f_2$ is 119 kHz, $f_3$ is 166 kHz and $f_4$ is 150 kHz, in which case $f_a$ and $f_b$ are 16 kHz and 47 kHz, respectively.

The oblique tracks on the magnetic tape 1 may again be arranged as described earlier with reference to FIG. 1, in which successive groups of four tracks $T_1$, $T_2$, $T_3$ and $T_4$, repeating in that order, have pilot signals recorded therein with the frequencies $f_1$, $f_2$, $f_3$ and $f_4$, respectively. The oblique tracks $T_1$ and $T_3$ are recorded by rotary magnetic head Ha and the oblique tracks $T_2$ and $T_4$ are recorded by rotary magnetic head Hb while capstan 21 is driven by motor 23 for continuously transporting tape 1 at a normal tape speed. The field of the video signal in each of the oblique tracks $T_1$, $T_2$, $T_3$ and $T_4$ is recorded with a portion of a vertical blanking period thereof recorded at one end of the respective oblique track.

The capstan motor 23 is coupled with a frequency generator 24 which generates a signal FG having a frequency varying in proportion to the speed of rotation of capstan motor 23. The signal FG from frequency generator 24 is supplied through an amplifier 25 to a speed error signal generator 26 which provides a speed error signal Es representing deviation of the speed of rotation of capstan motor 23 from a reference rotational speed predetermined for the operation of the apparatus in its recording and normal reproducing mode.

A video signal reproduced from magnetic tape 1 by rotary magnetic head Ha, Hb or Hc is supplied to a head switching circuit 31. A head switching signal HS1 suitably formed on the basis of signals representing rotational phases of the rotary magnetic heads Ha, Hb and Hc, respectively, and which reverses in level at every field period, as shown in FIG. 7A, is supplied through a terminal 41 to head switching circuit 31 for controlling the latter, and also to a control circuit 43 which, of course, may include a micro-processor or the like. Further, a mode indicating signal MIN is formed in accordance with a mode selecting operation to have different levels in the normal reproducing mode and in the slow-motion picture reproducing mode, respectively, and is supplied through a terminal 42 to control circuit 43. Control circuit 43 produces a head switching signal HS2 also supplied to head switching circuit 31, and which has a first level in the normal reproducing mode and during a tape transporting interval in the slow-motion picture reproducing mode for alternately selecting the outputs of heads Ha and Hb. However, during each still-picture reproducing interval in which the magnetic tape 1 is at rest in the slow-motion picture reproducing mode, signal HS2 has a second level for causing head switching circuit 31 to alternately select the outputs of heads Ha and Hc.

Thus, under the control of signals HS1 and HS2, head switching circuit 31 causes the fields of the video signal and associated pilot signals to be reproduced from oblique tracks $T_1$ or $T_3$ by rotary magnetic head Ha and from oblique tracks $T_2$ or $T_4$ by rotary magnetic head Hb and delivered alternately from heads Ha and Hb in successive field periods in the normal reproducing mode and during each tape transporting interval in the slow-motion picture reproducing mode. Further, under the control of signals HS1 and HS2, head switching circuit 31 causes a field of the video signal to be repeatedly reproduced from an oblique track $T_1$ or $T_3$ by the rotary magnetic heads Ha and Hc alternately in successive field periods during each still-picture reproducing interval in the slow-motion picture reproducing mode. The video signal Sp thus derived from head switching circuit 31 is supplied through a reproducing amplifier 32 to a video signal processing circuit (not shown) and also to a low-pass filter 33 from which a reproduced pilot signal Pp is derived.

A pilot signal generator 51 is provided for generating four pilot signals having respective frequencies $f_1$, $f_2$, $f_3$ and $f_4$ and which are supplied to a frequency selector 52. The frequency selector 52 is also supplied from control circuit 43 with a four-channel frequency selecting signal FS which is varied in accordance with the selected reproducing mode and which is operative to cause selector 52 to select, as a reference pilot signal Pr, that one of the four generated pilot signals having a frequency corresponding to the frequency of the pilot signal recorded in the oblique track on the magnetic tape 1 from which the video signal is being reproduced.

The reproduced pilot signal Pp obtained from low-pass filter 33 is multiplied by the reference pilot signal Pr obtained from frequency selector 52 in a multiplier 61 included in a tracking error signal generating circuit 60. In tracking error signal generating circuit 60, the output of multiplier 61 is supplied to two band-pass filters 62 and 63 having pass bands centered at frequencies of fa and fb, respectively. Therefore, a signal Sa having the frequency $f_a$ and a signal Sb having the frequency $f_b$ are derived from band-pass filters 62 and 63, respectively. The signal Sa is supplied to an envelope detector 64 which produces an output signal having a voltage level corresponding to the amplitude of the signal Sa. Similarly, the signal Sb is supplied to an envelope detector 65 which produces an output signal having a voltage level corresponding to the amplitude of the signal Sb. The output signals from envelope detectors 64 and 65 are supplied to a subtracter 66 and the output signal Ex from the latter, that is, the result of the subtraction of the output signals from envelope detectors 64 and 65, is supplied directly and through an inverter 67 to respective fixed contacts of a switch 68. The switch 68 is supplied from control circuit 43 with a mode switching signal TS which reverses in level at every field period in synchronism with the head switching signal HS1 in the normal reproducing mode and during each tape transporting interval in the slow-motion picture reproducing mode and which has a constant level during each still-picture reproducing interval in the slow-motion picture reproducing mode. Under the control of such mode switching signal TS, the signal Ex derived directly from subtracter 66 and the signal Ex inverted in polarity by inverter 67 are derived from the movable contact of switch 68 alternately in successive field periods in the normal reproducing mode and during each tape transporting interval in the slow-motion picture reproducing mode. On the other hand, during each still-picture reproducing interval in the slow-motion picture reproducing mode, the signal Ex derived directly from subtracter 66 is output continuously from switch 68. Such output from switch 68 constitutes a tracking error signal Et obtained from tracking error signal generating circuit 60.

The tracking error signal Et from tracking error signal generating circuit 60 and the speed error signal Es from speed error signal generator 26 are both supplied to a first input of an operational amplifier 71. An output of operational amplifier 71 is supplied to a first input of another operational amplifier 72 and an output of operational amplifier 72 is supplied to a driving circuit 73. An output of driving circuit 73 is supplied to a driving control circuit 74 for capstan motor 23. The driving control circuit 74 is further supplied from control circuit 43 with an ON-OFF timing signal CON for selectively causing capstan motor 23 to be operative and inoperative, and with a deceleration timing signal CCW for regulating deceleration of capstan motor 23.

The tracking error signal Et obtained from tracking error signal generating circuit 60 is further supplied to one end of a switch 81 which, together with a condenser 82 connected to the other end of switch 81 and grounded through a resistor 83, constitutes a sample and hold circuit. A sampling signal GS is supplied to switch 81 from control circuit 43 for periodically closing switch 81. In this sample and hold circuit, the tracking error signal Et occurring during the scanning of the middle portion of an oblique track is gated in response to the action of sampling signal GS on switch 81, and the sampled level of the tracking error signal Et is held by condenser 82 to produce a sample-hold output signal Ec. The condenser 82, in association with resistor 83 provides the sample and hold circuit with a predetermined time constant.

In the case where the width of each of the oblique tracks $T_1$ and $T_3$ formed by rotary magnetic head Ha is different from the width of each of the oblique tracks $T_2$ and $T_4$ formed by the rotary magnetic head Hb, or where an effective width of magnetic head Ha for scanning each of the oblique tracks $T_1$ and $T_3$ is different from an effective width of rotary magnetic head Hb for scanning each of the oblique tracks $T_2$ and $T_4$, the tracking error signal Et obtained during the still-picture reproducing interval in the slow-motion picture reproducing mode would not exactly represent deviation of the scanning path of the rotary magnetic head Ha or Hc from a proper path in relation to the oblique track $T_1$ or $T_3$ being scanned repeatedly by heads Ha and Hc alternately. As a result, if sampling and holding of the tracking error signal Et is performed a large number of times by the sampling and hold circuit including the switch 81 and the condenser 82, errors in the level of sample-hold output signal Ec are accumulated and may increase undesirably. To avoid such a problem, it is preferable that the sampling and holding of the tracking error signal Et is performed only in respect to the tracking error signal Et obtained while reproducing only a few of the video signal fields at the end of the still-picture reproducing interval.

The sample-hold output signal Ec obtained at condenser 82 is supplied through an amplifier 84 to one input of an operational amplifier 85 which, at another input thereof, is provided with a biasing voltage Bs adjusted by a variable resistor 86. An output signal Ei of operational amplifier 85 and a biasing voltage Bn adjusted by a variable resistor 87 are supplied to fixed contacts, respectively, of a switch 88 which is operative by a mode switching signal NS supplied from control circuit 43 and having different levels in the normal reproducing mode and in the slow-motion picture reproducing mode, respectively. Under the control of mode switching signal NS, switch 88 supplies either output signal Ei or biasing voltage Bn through an amplifier 89 to second inputs of operational amplifiers 71 and 72.

At the beginning of each tape transporting interval in the slow-motion picture reproducing mode, an accelerating signal CWD is supplied from control circuit 43 through a diode 91 to the first input of operational amplifier 72 for causing acceleration of capstan motor 23.

In the above-described apparatus according to an embodiment of this invention, the normal reproducing mode and the slow-motion picture reproducing mode are selectively established and, in accordance therewith, a characteristic mode indicating signal MIN is applied to terminal 42.

Figure 2B:
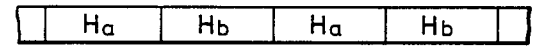
Figure 1:
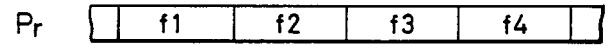
Figure 1:
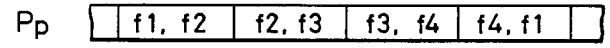
Figure 1:
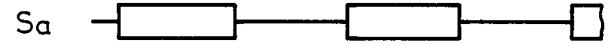
Figure 1:
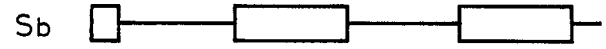
Figure 1:
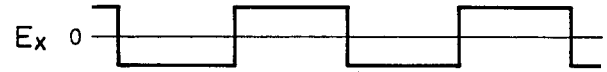
Figure 1:
Figure 1:
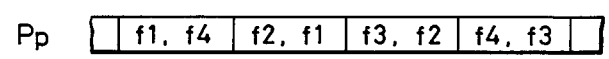
Figure 1:
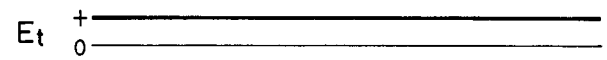

In the normal reproducing mode, field segments of the video signal reproduced from oblique tracks $T_1$ or $T_3$ by rotary magnetic head Ha and field segments of the video signal reproduced from oblique tracks $T_2$ or $T_4$ by rotary magnetic head Hb are to be derived from head switching circuit 31 alternately in successive field periods. In order to achieve the foregoing, the head switching signal HS1 is reversed or changed in level at every field period, as shown in FIG. 2A, and is supplied to head switching circuit 31 so as to select rotary magnetic heads Ha and Hb alternately at every field period as shown in FIG. 2B. In synchronism with such switching operation of head switching circuit 31, frequency selecting signal FS causes frequency selector 52 to provide reference pilot signal Pr with the frequency $f_1$, $f_2$, $f_3$ or $f_4$ selected in the order of $f_1 \rightarrow f_2 \rightarrow f_3 \rightarrow f_4 \rightarrow f_1$ repeatedly, as shown in FIG. 2C. Switch 68 in the tracking error signal generating circuit 60 is switched by signal TS to select the signal Ex obtained directly from subtracter 66 during each field period in which the reference pilot signal Pr is provided with the frequency $f_1$ or $f_3$ and to select the signal Ex inverted in polarity by inverter 67 in each field period in which the reference pilot signal Pr is provided with the frequency $f_2$ or $f_4$. The switch 88 is set by signal NS to continuously select the biasing voltage Bn and supply the same to operational amplifiers 71 and 72. Further, the ON-OFF timing signal CON is maintained at a high level so that capstan motor 23 operates continuously to transport the tape at the normal speed.

If the scanning path of rotary magnetic head Ha is deviated from a track $T_1$ to the right, that is, in the direction opposed to the direction of the tape travel, as shown by the broken line Tr in FIG. 1, in a field period during which the reference pilot signal Pr is provided with the frequency $f_1$, as shown in FIG. 2C, the reproduced pilot signal Pp will contain a component of the frequency $f_1$ and a component of the frequency $f_2$ mixed with the component of the frequency $f_1$, as shown in FIG. 2D. At this time, the output of multiplier 61 will include a component having the frequency $f_1-f_2=f_a$, and such component or signal Sa having the frequency $f_a$ is obtained from band pass filter 62, as shown in FIG. 2E and is detected by envelope detector 64. The resulting voltage output from detector 64 is applied to the negative input of subtracter 66. Therefore, the signal Ex obtained from subtracter 66 has a negative voltage level, as shown in FIG. 2G, and the tracking error signal Et obtained from the output of switch 68 has a negative voltage level (FIG. 2H) varying in proportion to the amount of the deviation of the scanning path of rotary magnetic head Ha from track $T_1$.

Similarly, if the scanning path of the rotary magnetic head Ha is deviated from an oblique track $T_3$ to the right in FIG. 1 in a field period during which the reference pilot signal Pr is provided with the frequency $f_3$, the reproduced pilot signal Pp contains a component of the frequency $f_3$ and a component of the frequency $f_3$ mixed with a component of the frequency $f_4$, as shown on FIG. 2D. Once again, the signal Sa having the frequency $f_a$ ($f_a=f_3-f_4$) is obtained from band pass filter 62 in the field period in which the reference pilot signal Pr is provided with the frequency $f_3$, as shown in FIG. 2E.

On the other hand, if the scanning path of rotary magnetic head Hb is deviated from an oblique track $T_2$ or $T_4$ to the right, as viewed in FIG. 1, in a field period during which the reference pilot signal Pr is provided with the frequency $f_2$ or $f_4$, respectively, the reproduced pilot signal Pp contains a component of the frequency $f_2$ and a component of the frequency $f_3$ mixed with a component of the frequency $f_2$, or signal Pp contains a component of the frequency $f_4$ and a component of the frequency $f_1$ mixed with a component of the frequency $f_4$, respectively, as shown in FIG. 2D. In the case of scanning a track $T_2$ or $T_4$, a signal Sb having the frequency $f_b$ ($f_b=f_2-f_3$ or $f_4-f_1$) is obtained from band pass filter 63 in each field period in which the reference pilot signal Pr is provided with the frequency $f_2$ or $f_4$, respectively, as shown in FIG. 2F.

Such signal Sb is detected by envelope detector 65 and the resulting voltage output of detector 65 is applied to the positive input of subtracter 66. Accordingly, the signal Ex obtained from subtractor 66 has a negative voltage level in each field period in which the reference pilot signal Pr is provided with the frequency $f_1$ or $f_3$ and a positive voltage level in each field period in which the reference pilot signal Pr is provided with the frequency $f_2$ or $f_4$, as shown in FIG. 2G.

As earlier noted, in the normal reproducing mode, switch 68 is switched by signal TS to select the signal Ex directly from subtracter 66 during each field period in which reference pilot signal Pr is given the frequency $f_1$ or $f_3$ and to select the inverted signal Ex from inverter 67 during each field period in which reference pilot signal Pr is given the frequency $f_2$ or $f_4$. Accordingly, when the path of head Ha or Hb is deviated toward the right, as viewed on FIG. 1, from the oblique track to be scanned thereby, the tracking error signal Et obtained at the output of switch 68 has a negative voltage level varying in proportion to the amount of the deviation of the scanning path of the rotary magnetic head Ha or Hb from an oblique track $T_1$ or $T_3$, or from an oblique track $T_2$ or $T_4$, respectively, as shown in FIG. 2H.

To the contrary, if the scanning path of rotary magnetic head Ha is deviated from the oblique track $T_1$ to the left, as shown by the dot-dash line $T_l$ in FIG. 1, in a field period during which the reference pilot signal Pr is given the frequency $f_1$, the reproduced pilot signal Pp contains a component of the frequency $f_1$ and a component of the frequency $f_4$ mixed with a component of the frequency $f_1$, as shown in FIG. 2I. In such case, a signal Sb having the frequency $f_b$ ($f_b=f_4-f_1$) is obtained from band pass filter 63, and detected by envelope detector 65 to provide a corresponding voltage output to the positive input of subtracter 66. Therefore, in a field period during which the reference pilot signal Pr is given the frequency $f_1$, the signal Ex obtained from subtracter 66 has a positive voltage, and the tracking error signal Et obtained at the output of switch 68 at that time has a positive voltage level varying in proportion to the amount of the deviation of the scanning path of rotary magnetic head Ha from the oblique track T, as shown in FIG. 2J.

Further, if the scanning path of the rotary magnetic head Ha or Hb is deviated from an oblique track $T_3$, or from an oblique track $T_2$ or $T_4$, respectively, to the left in FIG. 1 in a field period during which the reference pilot signal Pr is given the frequency $f_3$, $f_2$ or $f_4$, respectively, the reproduced pilot signal Pp respectively contains a component of the frequency $f_3$ and a component of the frequency $f_2$ mixed with a component of the frequency $f_3$; a component of the frequency $f_2$ and a component of the frequency $f_1$ mixed with a component of the frequency $f_2$; or a component of the frequency $f_4$ and a component of the frequency $f_3$ mixed with the component of the frequency $f_4$, as shown in FIG. 2I. In such cases, the signal Sb having the frequency $f_b$ ($f_b = f_2 - f_3$) is obtained from band pass filter 63 in each field period in which the reference pilot signal Pr is given the frequency $f_3$ and the signal Sa having the frequency $f_a$ ($f_a = f_1 - f_2 = f_3 - f_4$) is obtained from band pass filter 62 in each field period in which the reference pilot signal Pr is given the frequency $f_2$ or $f_4$.

Accordingly, the signal Ex obtained from subtracter 66 has a positive voltage level in each field period in which the reference pilot signal Pr is given the frequency $f_1$ or $f_3$ and a negative voltage level in each field period in which the reference pilot signal Pr is given the frequency $f_2$ or $f_4$, so that the tracking error signal Et obtained at the output of switch 68 has a positive voltage level varying in proportion to the amount of the deviation toward the left, as viewed on FIG. 1, of the scanning path of the rotary magnetic head Ha or Hb from a track $T_1$ or $T_3$ or from a track $T_2$ or $T_4$, as shown in FIG. 2J.

Speed servo control and tracking servo control in relation to capstan motor 23 are carried out with the speed error signal Es obtained from speed error signal generator 26 and the tracking error signal Et obtained from tracking error signal generating portion 60 as described above. Consequently, the normal reproducing operation is performed in such a way that rotary magnetic head Ha appropriately scans the oblique tracks $T_1$ and $T_3$ and rotary magnetic head Hb appropriately scans the oblique tracks $T_2$ and $T_4$.

Assuming now that the slow-motion picture reproducing mode is selected, for example, at a time $t_0$ shown in FIGS. 7A to 7I, while the VTR is operating in its normal reproducing mode. At the selection of the slow-motion picture reproducing mode, the head switching signal HS1 reversing in level at every field period, as shown in FIG. 7A, is still supplied to head switching circuit 31 so as to initially select the rotary magnetic heads Ha and Hb alternately at every field period, as shown in FIG. 7B, while the reference pilot signal Pr obtained from frequency selector 52 is given the frequency $f_1$, $f_2$, $f_3$ or $f_4$ in the order $f_1 \to f_2 \to f_3 \to f_4 \to f_1$ repeatedly, as shown in FIG. 7C.

Figure 8:
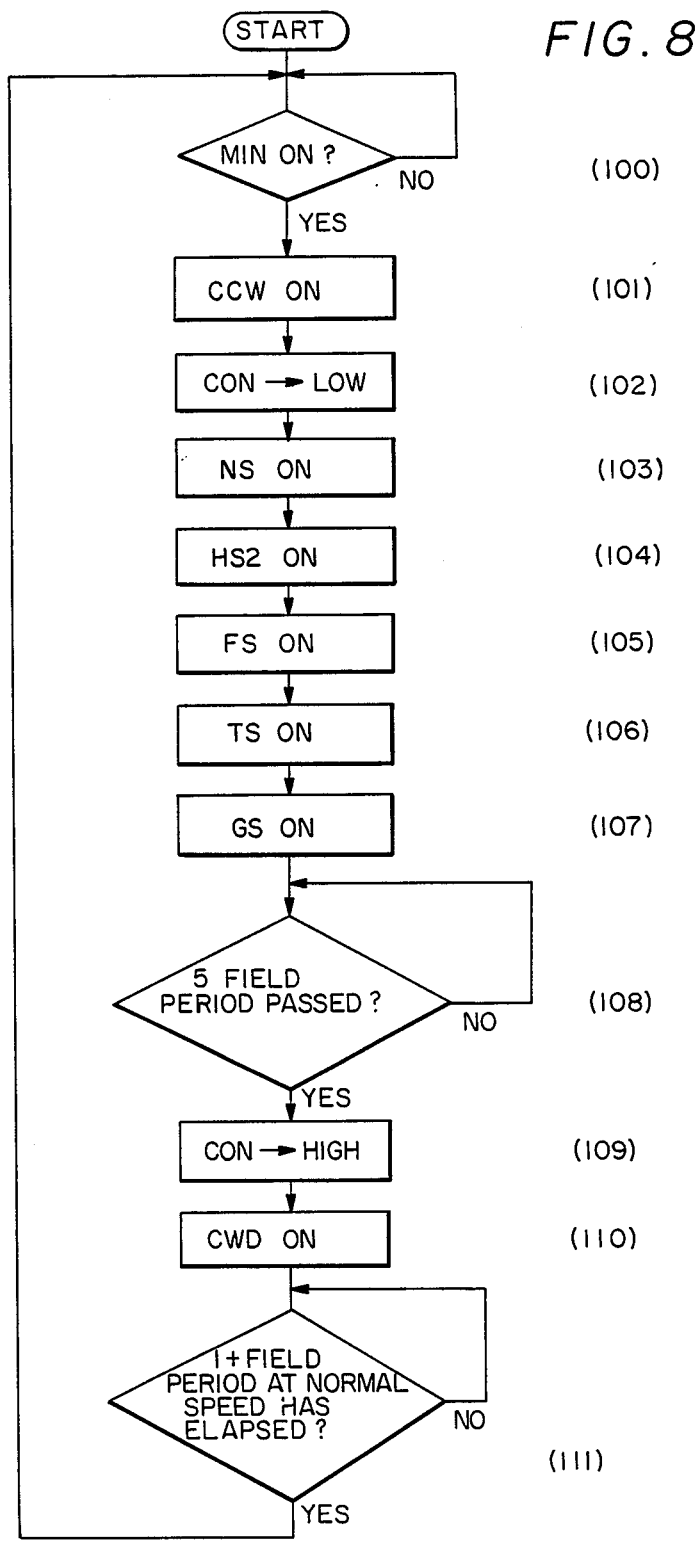
FIG. 8 is a flow chart to which reference will be made in explaining the operation of a control circuit in a VTR embodying the invention.

In response to the selection of the slow-motion picture reproducing mode, the mode indicating signal MIN supplied from the terminal 42 to control circuit 43 is turned ON or has its level changed at the time $t_0$. The control circuit or microprocessor 43, whose operating program will be described with reference to the flow chart of FIG. 8 and the timing charts of FIGS. 7A-7I, determines that the signal MIN is ON in step (100). As a result of the foregoing, the deceleration timing signal CCW is changed or turned ON in step (101) by control circuit 43 to have a high level at a time $t_2$ a little later than the first time $t_1$ at which the reference pilot signal Pr is changed to the frequency $f_1$ after the time $t_0$, as shown in FIGS. 7E and 7C. In response to the turning ON or change of deceleration timing signal CCW to the high level, capstan motor 23 is decelerated from a normal rotational speed, as shown in FIG. 7G. Further, in the next step (102), the ON-OFF timing signal CON is changed to a low level from a high level at a time a little after the time $t_2$, as shown in FIG. 7D, and the slow-motion picture reproducing operation actually commences at a time $t_3$ corresponding to the beginning of the first field period commencing after the ON-OFF timing signal CON is changed to the low level.

At such time $t_3$, the microprocessor 43 is operative in the next step (103) to change or turn ON the signal NS and the switch 88 is changed over by the signal NS to the position shown on FIG. 5, thereby to select the output signal Ei obtained from operational amplifier 85 and capstan motor 23 is made inoperative for a still-picture reproducing interval from time $t_3$ to the time $t_5$, and during which a field segment of the video signal is repeatedly reproduced from an oblique track $T_1$. In the still-picture reproducing interval which corresponds to the next step (104) and in which a field segment of the video signal is repeatedly reproduced from an oblique track $T_1$, head switching signal HS2 is supplied from control circuit or microprocessor 43 to head switching circuit 31 so as to select the rotary magnetic heads Hc and Ha alternately at every field period, as shown in FIG. 7B, and frequency selecting signal FS is turned ON in the succeeding step (105) and causes the reference pilot signal Pr to have the frequency $f_1$ throughout the still-picture reproducing interval, as shown in FIG. 7C.

With the above-described switching operation of head switching circuit 31, the field segments of the video signal repeatedly reproduced from an oblique track $T_1$ by rotary magnetic head Hc and the field segments of the video signal repeatedly reproduced from the same oblique track $T_1$ by rotary magnetic head Ha are alternately derived from head switching circuit 31 at every field period, and during such repeated reproduction from the same track $T_1$, the signal TS is turned ON, as in the step (106), so that the switch 68 in the tracking error signal generating portion 60 is maintained in the condition shown on FIG. 5 to select the signal Ex obtained directly from subtracter 66 in each field period.

Figure 6:
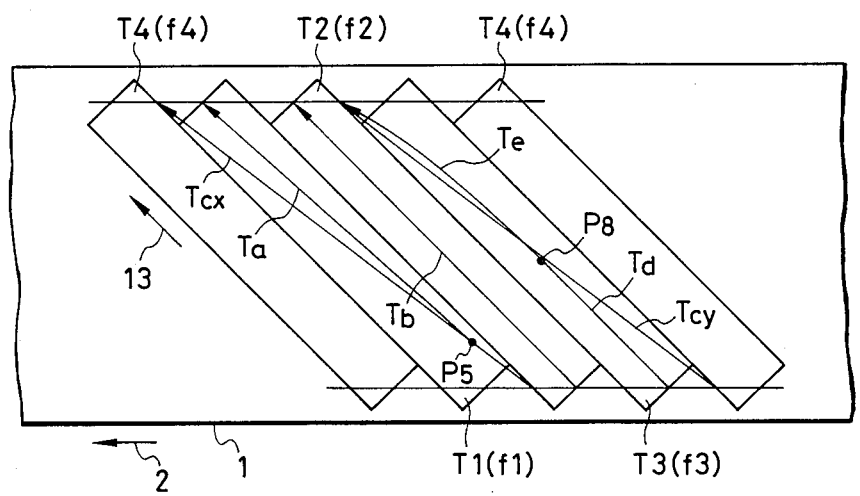
FIG. 6 is a schematic illustration showing scanning paths of a rotary magnetic head on a magnetic tape in a slow-motion picture reproducing mode of the VTR illustrated on FIG. 5.

When the tape transport is controlled so that each of the scanning paths of rotary magnetic heads Hc and Ha on the magnetic tape 1 laterally bisects the oblique track $T_1$ at the middle portion thereof considered in the longitudinal direction of the oblique track $T_1$, as shown by the solid line Tc in FIG. 1 and by a solid straight line Tcx in FIG. 6, the reproduced pilot signal Pp contains, in addition to the component of the frequency $f_1$, a component of the frequency $f_2$ mixed with the component of the frequency $f_1$, in the first half of the field period, and a component of the frequency $f_4$ mixed with the component of the frequency $f_1$ in the later half of the field period, as shown in FIG. 3D. The level of the component of the frequency $f_2$ in the reproduced pilot signal Pp is relatively large at the beginning of the field period and decreases gradually from the beginning to the middle of the field period. The level of the component of the frequency $f_4$ in the reproduced pilot signal Pp increases gradually from the middle to the terminal end of the field period. Therefore, during the first half of the field period, the signal Sa having the frequency $f_a$ ($f_a=f_1-f_2$) and a level decreasing gradually from the beginning to the middle of the field period is obtained from band pass filter 62, as shown in FIG. 3E, and, during the second half of the field period, the signal Sb having the frequency $f_b$ ($f_b=f_4-f_1$) and a level increasing gradually from the middle to the terminal end of the field period is obtained from band pass filter 63, as shown in FIG. 3F. As a result of the foregoing, the tracking error signal Et is obtained in the form of a sawtooth voltage which is zero at the middle of each field period, as shown by the solid line in FIG. 3G.

On the other hand, when each of the scanning paths of the rotary magnetic heads Hc and Ha on the magnetic tape 1 deviates toward oblique track $T_2$ from the scanning path that laterally bisects the middle portion of track $T_1$ considered in the longitudinal direction thereof, as shown by the broken line $T_R$ in FIG. 1, the tracking error signal Et is in the form of a sawtooth voltage which has a relatively low level in its entirety and is provided with a negative value at the middle of the field period, as shown by a broken line in FIG. 3G. Moreover, when each of the scanning paths of the rotary magnetic heads Hc and Ha on the magnetic tape 1 deviates in the direction toward oblique track $T_4$ from the scanning path which laterally bisects the middle portion of track $T_1$ considered in the longitudinal direction thereof, as shown by dot-dash line $T_L$ in FIG. 1, the tracking error signal Et is then in the form of a sawtooth voltage which has a relatively high level in its entirety and is provided with a positive value at the middle of the field period, as shown by a dot-dash line in FIG. 3G.

In the example being explained with reference to FIGS. 7A to 7I, and 8 one field segment of a video signal recorded in oblique track $T_1$ is reproduced five times during the still-picture reproducing interval commencing at the time $t_3$, and the tracking error signal Et in the form of a sawtooth waveform, as shown in FIG. 7H, is sampled at the middle of each field period in response to the sampling signal GS provided in the step (107) by the control circuit 43, shown in FIG. 7I, and held to form the sample-hold output signal Ec. This sample-hold output signal Ec is inverted in polarity by operational amplifier 85 and supplied to driving circuit 73 with the original polarity through operational amplifiers 71 and 72.

In the succeeding step (108), it is determined when five field periods after the time $t_3$, have elapsed at the time $t_4$ on FIG. 7H. Shortly thereafter at the time $t_5$ in the step (109), ON-OFF timing signal CON is made to rise to the high level, as shown in FIG. 7D, and the accelerating signal CWD (FIG. 7F) is supplied in the step (110) from control circuit 43 through diode 91 to operational amplifier 72, so that capstan motor 23 is accelerated, as shown in FIG. 7G, while head Ha scans track $T_1$.

After that, capstan motor 23 is driven at a constant speed equal to the normal speed in the normal reproducing mode for a time interval extending from a time $t_6$ through a field period, ending at a time $t_7$ and during which head Hb scans an oblique track $T_2$, to a time $t_8$ within the next field period during which head Ha scans an oblique track $T_3$. When the time $t_8$ is determined in the step (111), the program is recycled to the initial step (100) and, if the mode indicating signal MIN is then ON, that is, if the slow-motion picture reproducing mode is still selected, deceleration timing signal CCW is changed again in repeated step (101) to have a high level, as shown in FIG. 7E, and, in response to such high level of deceleration timing signal CCW, capstan motor 23 is decelerated from its normal constant rotational speed, as shown in FIG. 7G. Further, in the next step (102) ON-OFF timing signal CON is again changed to the low level from the high level at a time a little later than the time $t_8$, as shown in FIG. 7D, and the capstan motor 23 is made inoperative at a time $t_9$, as shown in FIG. 7G. Thus, the magnetic tape 1 is transported during the three successive field periods extending from time $t_4$ to time $t_9$, and such interval of tape transport is followed by another still picture reproducing interval of 5 field periods duration during which the tape is at rest and a single track is repeatedly scanned by the heads $H_c$ and $H_a$. It will be appreciated that the alternate intervals of tape transport and of still-picture reproducing are repeated so long as the slow-motion picture reproducing mode is selected.

In the above-described embodiment of the invention, the sample-hold output signal Ec obtained by sampling and holding the tracking error signal Et at the middle of each field period during the still-picture reproducing interval between the times $t_3$ and $t_4$, that is, prior to the transportation of the magnetic tape 1, is supplied to driving circuit 73 and the acceleration characteristic of capstan motor 23 between the time $t_5$ and $t_6$ in the tape transporting period is varied in response to the level of the sample-hold output signal Ec. Thus, the acceleration characteristic of capstan motor 23 is varied in response to deviation of the scanning paths of rotary magnetic heads Hc and Ha in respect to a track $T_1$ on the magnetic tape 1 in the still-picture reproducing interval $t_3$ to $t_4$ prior to the transportation of the magnetic tape 1. As a result of the foregoing, each of the scanning paths of the rotary magnetic heads Hc and Ha on the magnetic tape 1 in the still-picture reproducing interval commencing at the time $t_9$ after the transportation of the magnetic tape 1 is made to laterally bisect the middle portion, considered in the longitudinal direction, of the oblique track $T_3$.

More particularly, as is apparent from the waveform of the tracking error signal Et in FIG. 3G, when each of the scanning paths of rotary magnetic heads Hc and Ha on magnetic tape 1 is made to laterally bisect the middle portion, considered in the longitudinal direction, of oblique track $T_1$, as indicated by the straight line Tcx in FIG. 6, in the still-picture reproducing interval from the time $t_3$ to the time $t_4$ on FIG. 7G the level of the sample-hold output signal Ec becomes zero. Therefore, the capstan motor 23 is accelerated between the times $t_5$ and $t_6$ in accordance with the acceleration characteristic represented by the solid line in FIG. 7G. During such acceleration of capstan motor 23, rotary magnetic head Ha scans oblique track $T_1$ along a path represented by a curve Ta starting from a point P5 on FIG. 6 during a period from time $t_5$ to time $t_6$. Then, rotary magnetic head Hb scans oblique track $T_2$ along a path represented by a straight line Tb in FIG. 6 during a period from the time $t_6$ to the time $t_7$ on FIG. 7G. Thereafter, rotary magnetic head Ha scans oblique track $T_3$ along a path represented by a straight line Td extending to a point P8 in FIG. 6 during a period from the time $t_7$ to the time $t_8$. Finally, at the conclusion of a tape transporting period, rotary magnetic head Ha continues scanning of oblique track $T_3$ along a path represented by a curve Te starting from point P8 in FIG. 6 during a period from the time $t_8$ to the time $t_9$. Accordingly, after the time $t_9$, rotary magnetic heads Hc and Ha alternately scan the same oblique track $T_3$ along a path represented by a straight line Tcy in FIG. 6. Each of such scanning paths of rotary magnetic heads Hc and Ha on the magnetic tape 1 is seen to laterally bisect the middle portion of track $T_3$, considered in the longitudinal direction thereof, during the still-picture reproducing interval after the time $t_9$.

When each of the scanning paths of rotary magnetic heads Hc and Ha on the magnetic tape 1 is deviated in the lateral direction toward track $T_2$ from the path represented by the straight line Tcx in FIG. 6 in the still-picture reproducing interval from the time $t_3$ to the time $t_4$, the sample-hold output signal Ec has a negative voltage level. Therefore, capstan motor 23 is accelerated in accordance with a characteristic having a relatively gentle inclination, as indicated by the lower broken line in FIG. 7G, after the time $t_5$, and, as a result, after the time $t_9$, rotary magnetic heads Hc and Ha alternately scan the oblique track $T_3$ along the path indicated by the straight line Tcy in FIG. 6.

On the other hand, when each of the scanning paths of rotary magnetic heads Hc and Ha on magnetic tape 1 is deviated in the direction toward track $T_4$ form the path represented by straight line Tcx in FIG. 6 during the still-picture reproducing interval from time $t_3$ to time $t_4$, the sample-hold output signal Ec has a positive voltage level. Therefore, capstan motor 23 is accelerated with a characteristic having a relatively steep inclination, as represented by the upper dot-dash line in FIG. 7G, after the time $t_5$. As a result, after the time $t_9$, rotary magnetic heads Hc and Ha alternately scan oblique track $T_3$ along the path represented by the straight line Tcy in FIG. 6.

In the tape transporting interval from time $t_4$ to time $t_9$, the field segments of the video signal reproduced respectively from oblique tracks $T_1$ and $T_3$ by rotary magnetic head Ha and the field segment of the video signal reproduced from an oblique track $T_2$ by rotary magnetic head Hb are alternately derived from head switching circuit 31 at every field period. Further, during such tape transporting interval, reference pilot signal Pr is provided with the frequency $f_1$ from the time $t_4$ to the time $t_6$, with the frequency $f_2$ from the time $t_6$ to the time $t_7$, and with the frequency $f_3$ from the time $t_7$ to the time $t_9$, as is apparent on FIG. 7C.

It will be appreciated that, in the slow-motion reproducing mode of the above-described embodiment of the invention, the tracking error signal Et which is sampled and held for providing the signal Ec that modifies the acceleration characteristic of the capstan motor 23 is derived by tracking errors detected during the preceding still-picture reproducing interval when the tape 1 is at rest so that variations in the torque generated by the motor 23 cannot adversely affect the tracking control.

Although a specific embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for slow-motion reproduction of a video signal having successive fields thereof, along with respective pilot signals, recorded in successive parallel tracks extending obliquely on a magnetic tape, the pilot signals recorded in a predetermined number of said tracks constituting a group thereof having respective different frequencies in an order that is repeated cyclically for each said group of tracks on the tape, the apparatus comprising:

rotary magnetic head means for reproducing a field of the video signal and a respective pilot signal by scanning substantially along one of said tracks;

capstan means coupled with a capstan motor for transporting the magnetic tape with reference to said rotary magnetic head means;

tracking error signal generating means for producing, based on pilot signals reproduced from the magnetic tape by said rotary magnetic head means, a tracking error signal varying in accordance with tracking errors of said rotary magnetic head means in relation to the one of said tracks being scanned thereby;

driving means made intermittently operative for causing said capstan motor and capstan means to transport the magnetic tape from one still-picture reproducing state, in which the tape is at rest and a field of the video signal is repeatedly reproduced by said rotary magnetic head means repeatedly scanning an initial one of said oblique tracks on the magnetic tape, to another still-picture reproducing state, in which the tape is again at rest and another field of the video signal is repeatedly reproduced by said rotary magnetic head means repeatedly scanning a succeeding one of said oblique tracks; and control means for controlling acceleration of said capstan motor by said driving means at the initiation of each said transport of the magnetic tape in response to said tracking error signal corresponding to the tracking errors of said rotary magnetic head means relative to a middle portion, considered in the longitudinal direction, of said initial track in said one still-picture reproducing state prior to said transport of the magnetic tape so that deviation of said rotary magnetic head means with reference to the middle portion, considered in the longitudinal direction, of said succeeding oblique track is minimized in said other still-picture reproducing state after said transport of the magnetic tape.

2. An apparatus according to claim 1; further comprising reference pilot signal supplying means for supplying, to said tracking error signal generating means, a reference pilot signal having a frequency corresponding, at any time, to the frequency of the pilot signal recorded in the one of said oblique tracks to be then scanned by said rotary magnetic head means; and in which said tracking error signal generating means includes means receiving said reference pilot signal and said pilot signals reproduced from the magnetic tape by said rotary magnetic head means scanning said initial one of the tracks for producing said tracking error signal therefrom.

3. An apparatus according to claim 2; in which said reference pilot signal supplying means includes pilot signal generating means for generating a plurality of reference pilot signals having said respective different frequencies of the pilot signals recorded in the respective tracks of each said group of tracks on the magnetic tape, and frequency selecting means selecting the one of said reference pilot signals which has the frequency of the pilot signal to be scanned by said rotary magnetic head means for supplying to said tracking error signal generating means.

4. An apparatus according to claim 2; in which said tracking error signal generating means includes signal multiplying means for multiplying pilot signals reproduced from the magnetic tape by said rotary magnetic head means by said reference pilot signal supplied from said reference pilot signal supplying means, filter means for extracting a predetermined frequency component from an output of said multiplying means, detecting means for producing a detection output having a level corresponding to the level of said predetermined frequency component extracted by said filter means, and signal processing means for forming said tracking error signal based on said detection output obtained from said detecting means.

5. An apparatus according to claim 2; in which said driving means includes driving circuit means connected to said capstan motor for operating the latter in accordance with control signals from said control means and said tracking error signal from the tracking error signal generating means.

6. An apparatus according to claim 2; in which said control means includes controller means for selectively supplying respective control signals to said tracking error signal generating means, driving means and reference pilot signal supplying means, sample and hold circuit means for sampling and holding a value of said tracking error signal corresponding to the tracking errors of said rotary magnetic head means relative to said middle portion, considered in the longitudinal direction, of said initial track repeatedly scanned in said one still-picture reproducing state, and means for selectively supplying the sampled and held valve of the tracking error signal to said driving means upon said transport of the magnetic tape in response to one of said control signals from said controller means.

7. An apparatus according to claim 1; in which there are four of said tracks in each said group thereof, and said pilot signals recorded in said four tracks have frequencies $f_1$, $f_2$, $f_3$ and $f_4$, respectively, in accordance with the relationships $$|f_1 - f_2| = |f_3 - f_4| = f_a$$

$$|f_2 - f_3| = |f_4 - f_1| = f_b.$$

8. An apparatus according to claim 7; further comprising reference pilot signal supplying means for supplying, to said tracking error signal generating means, a reference pilot signal having a frequency corresponding, at any time, to the frequency of the pilot signal recorded in the one of said oblique tracks to be then scanned by said rotary magnetic head means; and in which said tracking error signal generating means includes means receiving said reference pilot signal and said pilot signals reproduced from the magnetic tape by said rotary magnetic head means scanning said initial one of the tracks for producing said tracking error signal therefrom.

9. An apparatus according to claim 8; in which said tracking error signal generating means includes signal multiplying means for multiplying pilot signals reproduced from the magnetic tape by said reference pilot signal supplied from said reference pilot signal supplying means, first and second filter means for extracting components of said frequencies $f_a$ and $f_b$, respectively, from an output of said multiplying means, first and second detecting means for producing detection outputs having levels corresponding to the levels of said components extracted by said first and second filter means, respectively, and signal processing means for forming said tracking error signal based on said detection outputs obtained from said detecting means.

10. An apparatus according to claim 9; in which said signal processing means includes subtracting means having negative and positive inputs receiving said detection outputs from said first and second detecting means, respectively, inverting means for inverting the polarity of an output of said subtracting means, and switch means having first and second conditions for selecting said output of the subtracting means and the output of said inverting means, respectively, as said tracking error signal; and in which said control means causes said switch means to alternately assume said first and second conditions in successive fields of said video signal in a normal reproducing mode of the apparatus and during said transport of the tape for slow-motion reproduction, and further causes said switch means to maintain one of said conditions thereof when the tape is in each said still-picture reproducing state.

11. An apparatus according to claim 10; in which said control means includes controller means for selectively supplying respective control signals to said tracking error signal generating means, driving means and reference pilot signal supplying means, sample and hold circuit means for sampling and holding a value of said tracking error signal corresponding to the tracking errors of said rotary magnetic head means relative to said middle portion considered in the longitudinal direction of said initial track scanned in said one still-picture reproducing state, and means for selectively supplying the sampled and held value of tracking error signal to said driving means during said transport of the magnetic tape in response to one of said control signals from said controller means.

12. An apparatus according to claim 11; in which said driving means has a predetermined normal acceleration characteristic at the commencement of said transport of the magnetic tape, and said acceleration characteristic is modified in accordance with said sampled and held value of the tracking error signal.

13. An apparatus according to claim 11; in which adjacent ones of said successive parallel tracks are recorded with different azimuths; and in which said rotary magnetic head means include first and second rotary heads having said different azimuths and being diametrically opposed for alternately reproducing the fields of said video signal and the respective pilot signals recorded in the tracks having corresponding azimuths when the apparatus is in said normal reproducing mode and during said transport of the tape for slow-motion reproduction, and a third rotary head having the same azimuth as said first head and being disposed near to said second head, said first and third rotary heads alternately reproducing the same field of the video signal when the tape is at rest.

* * * * *